Nov. 16, 1965  G. V. SADLER  3,218,489
LINEAR INDUCTION MOTOR FOR CRANES AND THE LIKE
Filed March 29, 1963  2 Sheets-Sheet 1
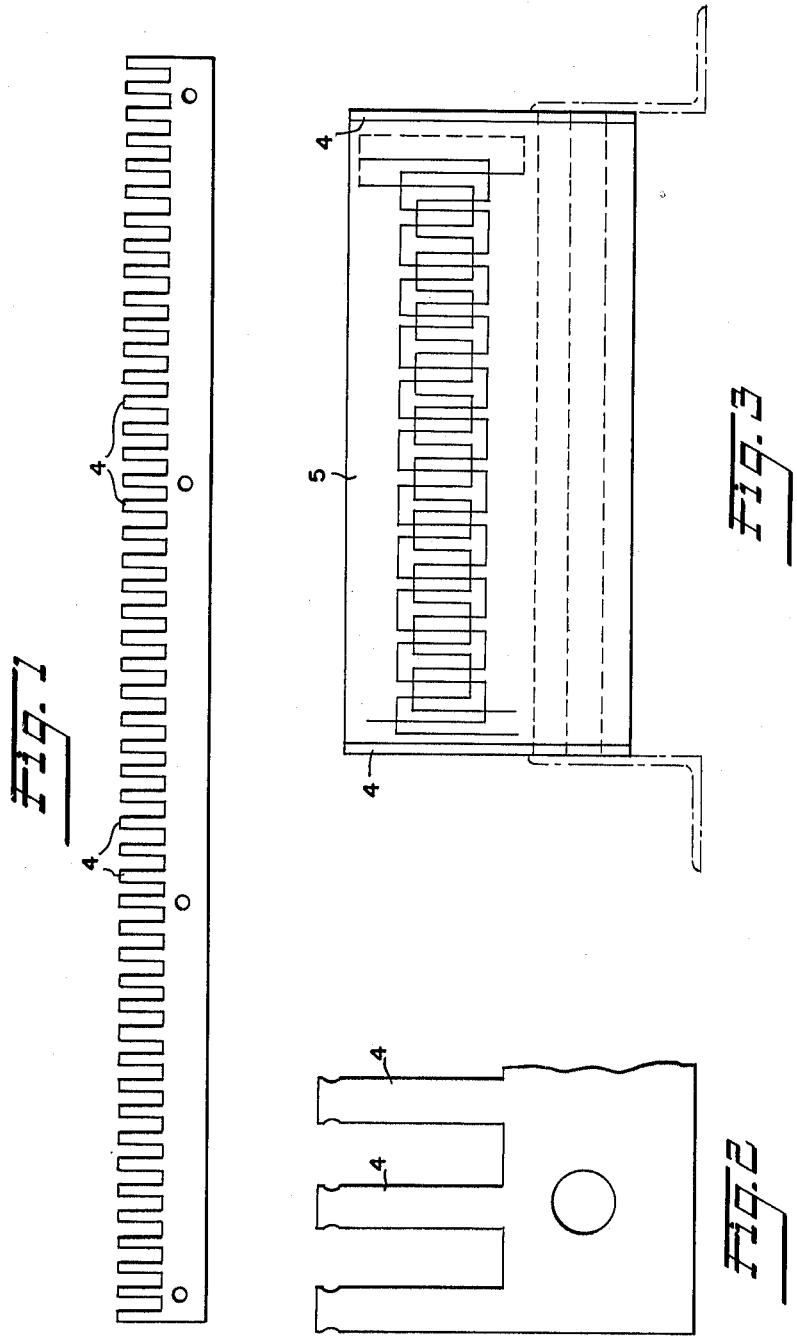
INVENTOR
GILBERT VAUGHN SADLER
BY Norris & Bateman
ATTORNEYS Nov. 16, 1965   G. V. SADLER   3,218,489
LINEAR INDUCTION MOTOR FOR CRANES AND THE LIKE
Filed March 29, 1963   2 Sheets-Sheet 2
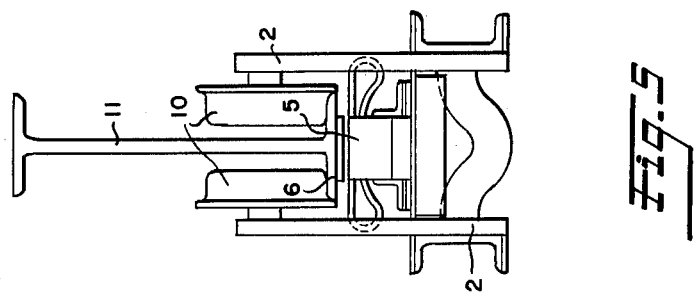
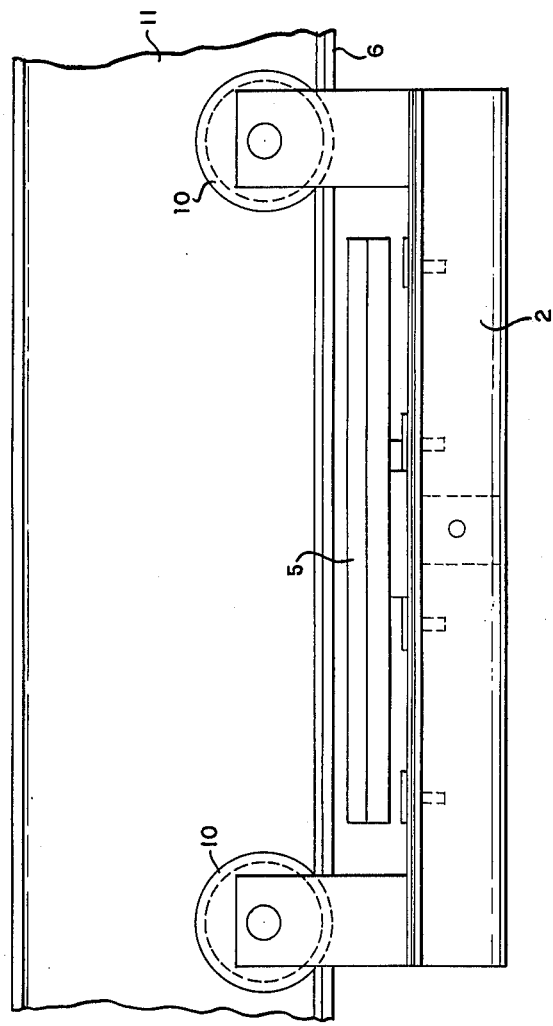
INVENTOR
GILBERT VAUGHN SADLER
BY   *Norris & Bateman*
ATTORNEYS United States Patent Office 3,218,489
Patented Nov. 16, 1965

3,218,489
LINEAR INDUCTION MOTOR FOR CRANES
AND THE LIKE
Gilbert Vaughan Sadler, Bowdon, England, assignor to Herbert Morris Limited, Loughborough, England, a corporation of Great Britain
Filed Mar. 29, 1963, Ser. No. 268,888
Claims priority, application Great Britain, Apr. 5, 1962, 13,073/62
1 Claim. (Cl. 310—13)

This invention relates to improvements in linear induction motors for employment on overhead travelling crane hoists or lifts. Hitherto these drives comprised a conventional circular induction motor driving reduction gearing.

In a squirrel cage induction motor the rotor is generally a self-contained arrangement of conducting bars in iron which requires no external electrical connections, slip rings or brushes and is therefore very robust and reliable.

It has been found that it is not essential to arrange the primary coils in a circular manner and that if the coils are arranged in a straight line a linearly moving magnetic field will be produced and a motor producing force in a straight line results.

According to the invention the moving structure for an overhead electric crane hoist or lift is constructed to carry the primary coil unit or units forming the field structure of a linear induction motor mounted in line thereon and cooperating with a plate or strip forming the armature mounted on a stationary structure whereby when current is applied to the coil unit or units the moving structure travels relatively to the plate or strip.

The invention will be described with reference to the accompanying drawings:

FIGURE 1 is a side elevation of a slotted field structure lamination of the motor.

FIGURE 2 is a detail view of one end of FIGURE 1 enlarged.

FIGURE 3 is an end view of the field structure of FIGURE 1.

FIGURE 4 is a fragmentary side elevation of a preferred embodiment of the invention wherein the field structure of FIGURES 1–3 is on the carriage and the armature is on the rail supporting the carriage.

FIGURE 5 is an end view of structure of FIGURE 4.

A carriage 2 for a crane or like apparatus is shown as mounted to travel along a rail 11 in FIGURES 4 and 5. The carriage is suspended from rail 11 by opposite side wheels 10 rolling along the lower flange of rail 11. The linear motor field structure of FIGURES 1–3 is mounted on the carriage, and the armature 6 extends along the bottom of the lower rail flange.

The field structure is provided with slotted laminations 4 to receive the coil or unit 5. A typical design for such a machine has a 16 pole winding, the slot pitch being ¾ inch. The winding is fully pitched, double layer with one slot per pole per phase of a three phase winding.

All the coil units are connected either in series or parallel in each phase, and the interconnections arranged so that opposite slots carry currents of the same phase in the same direction. With a field structure gap width of ⅜″, ¼″ of this is taken up by the ferrous aluminum or other conducting magnetisable metal armature plate or strip 6 acting as the rotor.

This plate or strip 6 extends the full length of the travel of the carriage or cage. The linear motor field structure is rigidly attached to the carriage and the travelling polyphase magnetic field interacts with the fixed plate or strip 6 forming the armature, thereby producing a horizontal force which is transmitted to drive the carriage 2.

Traction drives on cranes involve a large amount of acceleration, deceleration and reversing, the time during which a motor runs at full speed being very small. The overall efficiency of known drives is, therefore, low. The employment of a linear motor for crane traction drives is based on providing the maximum amount of horizontal thrust in relation to the available dimensions of the stator unit, secondary consideration being given to efficiency and power factor of the linear motor at full speed running.

In the FIGURES 4 and 5 construction coil units 5 are single sided and cooperate with the armature 6 which may be formed by the lower flange of a girder 11 providing the runways for carriage wheels 10.

The carriage 2 is underslung on the wheels 10 and the magnetic coupling of armature flange 6 of rail 11 produces a lifting force on the carriage which reduces the load on the wheels and therefore requires proportionately less horizontal thrust for the movement of the carriage.

A similar arrangement may be employed for a cross traverse carriage for the crane.

The advantages of using linear motors on traction drives for cranes hoists are:

1. The drive is independent of any co-efficient of friction, wheel or drive slip is impossible, and there is no need to add any weight to obtain adhesion between driving wheels and rail.
2. Only part of the motor is carried on the moving structure, the armature being part of the track or shaft itself. The effective weight of the motor is, therefore considerably reduced.
3. The problem with a conventional motor in dissipating the heat produced in starting, does not occur. In the case of a linear motor, the hot part of the armature is immediately left behind as the motor travels along.

What I claim is:

In a linear induction motor drive system for a crane or the like having a carriage supported by wheel means in rolling engagement with a relatively stationary horizontal rail, said carriage having a portion thereof extending beneath said rail, a single sided field structure mounted on said carriage portion and comprising a laminated core carrying a linearly arranged winding, said rail being a metal beam having a bottom flange supporting said wheel means, and a conducting metal armature carried by said flange and extending along the length of said rail spaced from said field structure by an air gap and in magnetic flux coupled relation with said field structure.

References Cited by the Examiner
UNITED STATES PATENTS

| 1,881,015 | 10/1932 | Ayers | 310—13 |
| 1,929,990 | 10/1933 | Rose | 310—13 |
| 2,337,430 | 12/1943 | Trombetta | 310—13 |
| 2,404,984 | 7/1946 | Powers | 318—135 X |
| 2,412,511 | 12/1946 | Jones | 310—13 |
| 2,428,570 | 10/1947 | Jones | 310—13 |
| 2,666,879 | 1/1954 | Godsey et al. | 318—135 |

ORIS L. RADER, Primary Examiner.
MILTON O. HIRSHFIELD, Examiner.